April 19, 1955     D. W. BINGHAM     2,706,589
SYRUPING APPARATUS FOR USE IN THE CANNING OF FRUIT
Filed Nov. 19, 1951     4 Sheets—Sheet 1
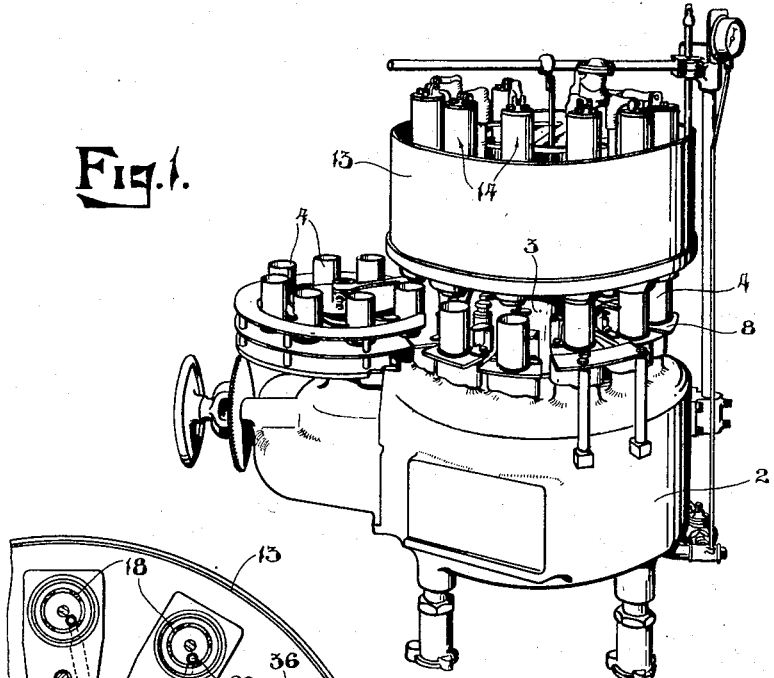
Fig.1.
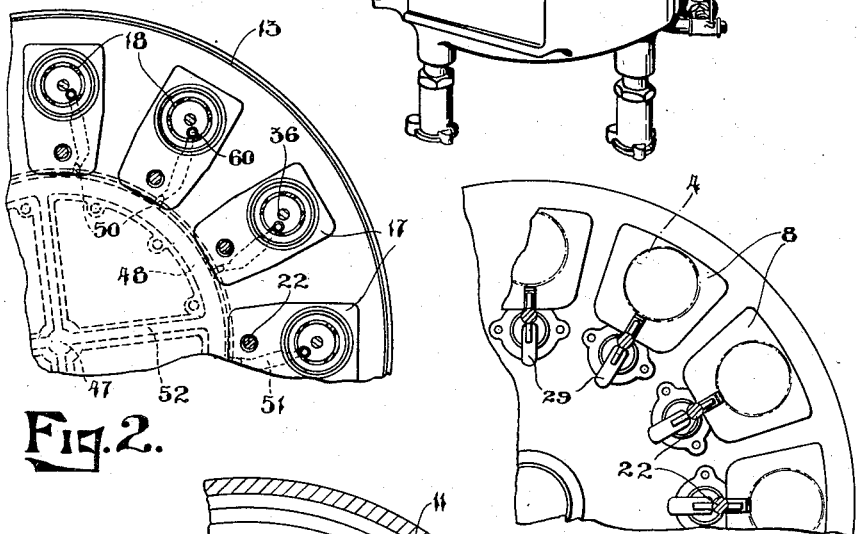
Fig.2.
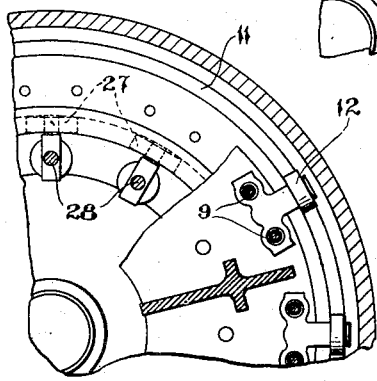
Fig.4.
Fig.3.
INVENTOR
DAVID W. BINGHAM
BY *[signature]*
ATTY.

April 19, 1955   D. W. BINGHAM   2,706,589
SYRUPING APPARATUS FOR USE IN THE CANNING OF FRUIT
Filed Nov. 19, 1951   4 Sheets-Sheet 2

INVENTOR
DAVID W. BINGHAM
BY
Atty.

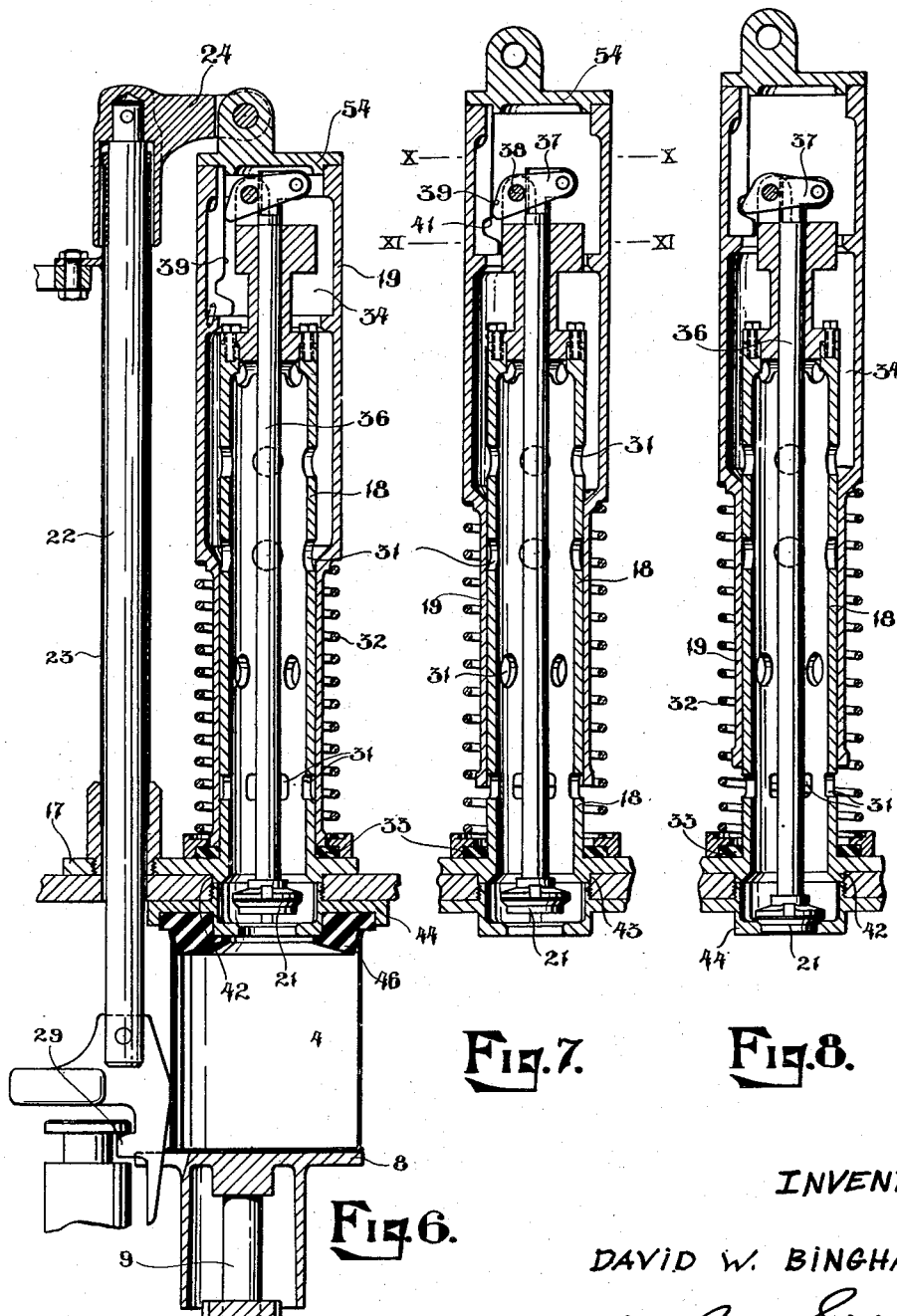

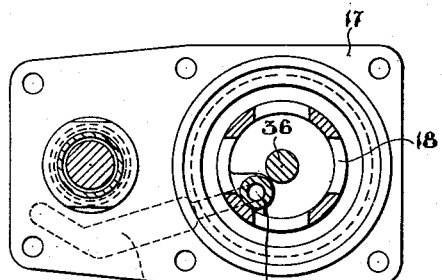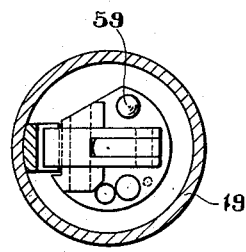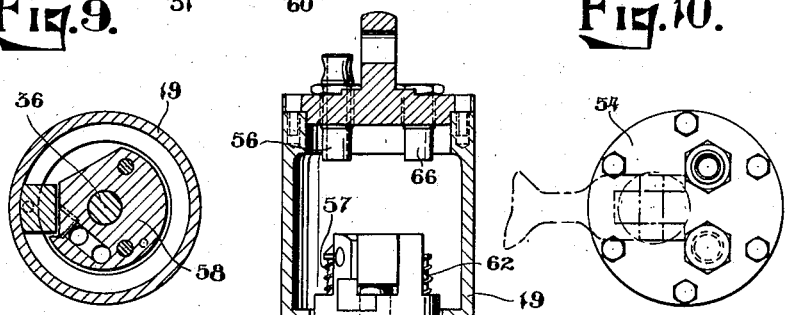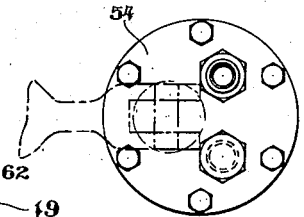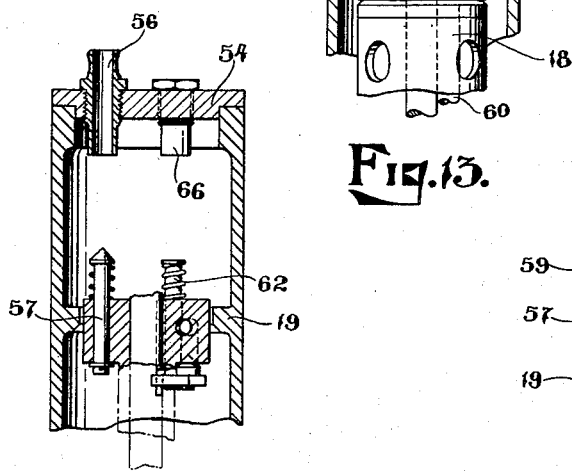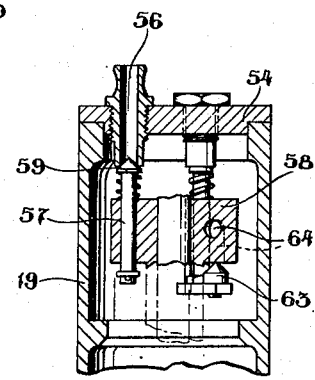

United States Patent Office 2,706,589
Patented Apr. 19, 1955

2,706,589

SYRUPING APPARATUS FOR USE IN THE CANNING OF FRUIT

David William Bingham, Brighton, Victoria, Australia

Application November 19, 1951, Serial No. 257,123

Claims priority, application Australia November 30, 1950

16 Claims. (Cl. 226—98)

This invention relates to apparatus for introducing syrup into cans after fruit has been packed therein prior to the closing of the can and the cooking of the contents. More particularly the invention concerns that type of syruping apparatus which employs a partial vacuum for removing most of the air trapped for example, beneath sections of halved fruit in the cans.

The primary object of the present invention is to provide improved vacuum syruping or like apparatus of the kind indicated which is of such novel design that manufacturing and maintenance costs are materially reduced whilst maintaining the efficiency of the apparatus at a relatively high level.

Other advantages are that simple and inexpensive mechanism may be employed for controlling the delivery of liquid to each can and determining the degree of vacuum to which the can and its contents are subjected during the filling operation. A relatively high vacuum is capable of being used without having to fit the apparatus with expensive valve mechanism.

No undesirable withdrawal of excess syrup through the vacuum line occurs as hitherto whilst the partial vacuum in the can and each of the filling heads is interrupted before the filling of each can is completed thereby permitting atmospheric pressure to force the remaining syrup into the can and reduce the amount of trapped air therein to a minimum. This also ensures maximum penetration of the syrup into the fruit and provides a relatively high degree of pre-ageing which is such an essential factor in improving the taste of canned fruit.

Various other advantages and novel constructional features of the improved apparatus will be more readily apparent from the following detailed description.

Referring to the drawings which form part of this specification:

Figure 1 is a perspective view of syruping apparaus in accordance with one embodiment of the present invention.

Figure 2 is an enlarged, fragmentary, sectional plan taken on the line II—II of Figure 5, parts being omitted for convenience of illustration.

Figure 3 is an enlarged, fragmentary, sectional plan taken on the line III—III of Figure 5, parts being omitted for convenience of illustration.

Figure 4 is an enlarged, fragmentary, sectional plan taken on the line IV—IV of Figure 5, parts being omitted for convenience of illustration.

Figure 6 is an enlarged, sectional elevation showing one of the filling heads with its main discharge valve in its open position.

Figure 7 is a view, similar to Figure 6, but showing a spring influenced sleeve in a partially raised position.

Figure 8 is a view, similar to Figure 6, showing the spring influenced sleeve in its fully raised position and the main discharge valve closed.

Figure 9 is an enlarged, sectional plan showing a ported base plate associated with each filling head.

Figure 10 is a sectional plan taken on the line X—X of Figure 7.

Figure 11 is a sectional plan taken on the line XI—XI of Figure 7.

Figure 12 is a plan view of the upper end portion of one of the filling heads.

Figure 13 is a fragmentary, sectional elevation of the upper end portion of one of the filling heads.

Figure 14 is a view, similar to Figure 13 but which shows more clearly the operative positions of a vacuum control valve and an air vent valve when the sleeve of the filling head occupies its raised position, the vacuum valve being closed and the air vent open.

Figure 15 is another view of the parts seen in Figure 14, but showing the sleeve in its lowered operative position, in which the air vent is closed and the vacuum control valve is open.

Figure 5:
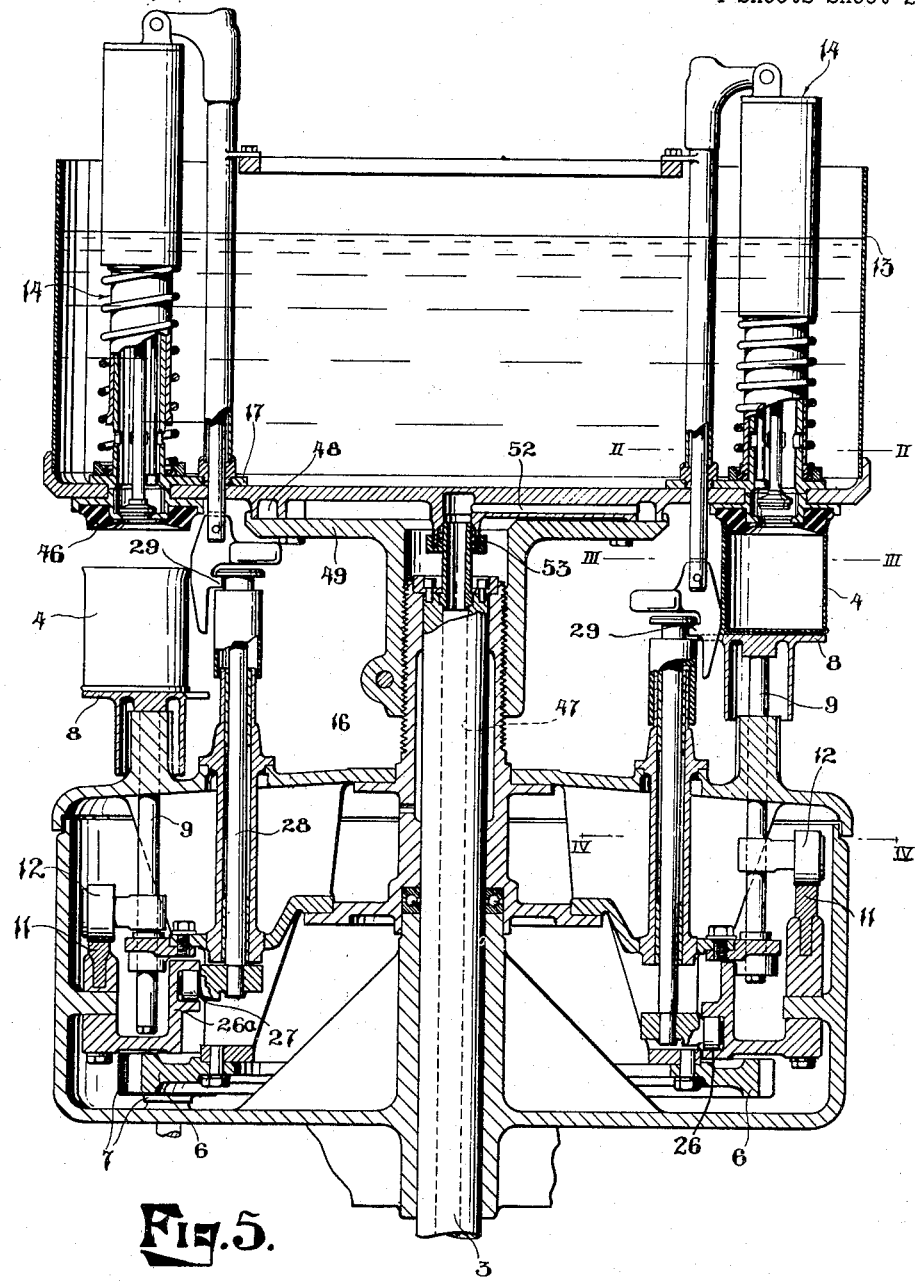
Figure 5 is a sectional elevation on an enlarged scale showing a main supply bowl carrying a series of filling heads and associated mechanism for actuating said filling heads in synchronism.

According to the present invention the improved apparatus includes a supporting unit carrying an upstanding central standard 3. Carried by this standard is rotary mounting means for a series of cans 4 and can filling mechanism. Any suitable means are provided for effected rotation of such mounting means. For example, the mounting means may be fitted as seen in Figure 5, with a ring gear 6 meshing with a pinion 7 on the supporting unit and driven by an electric motor or any other suitable source of power.

The rotary mounting means carries a series of circumferentially spaced can platforms 8 as seen more clearly in Figures 3 and 5 each of which may be mounted upon a vertically slidable post 9. Means are provided for effecting synchronized raising and lowering movements of the can platforms. For this purpose, a stationary cam track 11 of circular form may be provided on the supporting unit and adapted to be engaged by an anti-friction roller 12 on each of the platform posts.

The can filling mechanism includes a main supply bowl 13 for the syrup or other liquid which is to be supplied to the cans. The bowl is carried by the control standard 3 and may be kept filled to an appropriate level from any suitable bulk supply, for example, by means of a float controlled valve.

The bowl is adapted to supply the liquid to a series of filling heads 14 which are mounted upon the bottom of the bowl and arranged in circumferentially spaced relationship in registry with the can platforms.

Screw or any other suitable elevating means 16 (Fig. 5) are provided for raising and lowering the main supply bowl 13 and the filling heads carried thereby in relation to the series of platforms 8 so as to accommodate different sized cans.

Each of the filling heads is preferably constructed in the form of a removable unit including a ported base plate 17 carrying an upstanding cylinder 18, an associated sleeve 19 and a main discharge valve 21. Each base plate also carries a vertically slidable rod 22 accommodated within an upstanding tube 23 and provided at its upper end with a lateral extension 24 adapted for connection to the top of the adjacent sleeve 19, so as to raise and lower the latter lengthwise of its associated cylinder as hereinafter described.

All of the ported base plates and parts carried thereby are located within the main supply bowl and the liquid therein contained. The upstanding tubes 23 accommodating the vertically slidable rods are of such a length that they extend above the normal liquid level or top of the bowl and thus avoid any possibility of leakage therethrough.

Any suitable means are provided for actuating the vertically slidable rods 22 in synchronism. As seen more clearly in Figures 4 and 5, such actuating means may include a circular double parallel cam track 26 carried by the supporting unit and accommodating rollers 27 associated with the rods so as to impart the desired up and down movement thereto.

These rollers are preferably connected to a second or lower series of vertically slidable rods 28 on the aforesaid rotary mounting means and which are adapted to be detachably connected to the upper series of slidable rods 22. Each such connecting means may consist of a latch device 29 adapted to be engaged by a can when it is properly positioned on its platform whereby each pair of associated upper and lower rods are connected only when the related platform is occupied by a can. The arrangement is thus adapted to function as a "no can no feed" mechanism.

Each of the aforesaid cylinders 18 has a series of longitudinally spaced holes 31 therein to admit liquid from the main bowl and also to provide lubrication for the free sliding of each sleeve 19 on its associated cylinder.

Each of these sleeves is spring influenced for example, by a compression spring 32 in such a manner as to oppose downward movement of the sleeve on to a seating such as a sealing ring 33 in the bowl and surrounding the associated cylinder. The upper end portion of each sleeve is preferably of larger diameter than the lower end so as to provide a liquid discharge chamber 34. The latter in combination with its cylinder usually holds more liquid from the bowl than is required to fill a can.

Each of the main discharge valves 21 is carried by an upstanding stem 36 located axially within its cylinder and connected at its upper end to a lever arm 37 which is pivotally mounted as at 38 upon the cylinder and provided at its outer end with a cam face 39 adapted to be engaged by a striker element 41 on the associated sleeve.

The ported base plate 17 of each filling head is provided with a downwardly projecting circular shoulder 42 which is axially aligned with its cylinder and adapted to fit within a hole 43 in the bottom of the bowl. Each hole also accommodated a valve seating 44 attached to the bottom of the bowl and adapted to be engaged by the main discharge valve 21. This valve seating also preferably carries a resilient spacer element 46 adapted to fit within the top of a can 4 and ensure that sufficient space is left therein after the syruping operation has been completed prior to the fitting of a closing lid.

Associated with the foregoing is a vacuum pump or any other suitable vacuum producing means connected by piping and/or passages with each of the filling heads. For example, a main vacuum passage or pipe 47 leading from the pump may pass upwardly through the central standard 3 and communicate with a manifold in the bottom of the bowl. This manifold may be formed by providing a circular channel 48 of substantially inverted U shape in cross section in the bottom of the bowl and closing the channel by means of a suitable plate 49.

Branch passages 50 (Figure 2) extend between the manifold and the ports and passages 51 in each of the aforesaid base plates 17 whilst another branch passage 52 may be formed in the bowl bottom so as to communicate with a central coupling and gland 53 to which the main vacuum pipe is connected.

The top of the sliding sleeve in each filling head is located above the normal liquid level in the bowl and closed by a cover plate 54 or in any other suitable manner. Each sleeve is provided with vacuum control means and a closable air vent for subjecting each of the filling heads to the influence of the vacuum and subsequently admitting atmospheric pressure thereto as desired. For this purpose a valve controlled air vent may be provided in each filling head, an open ended pipe 56 being provided for example, in the top of the sliding sleeve 19 in alignment with a spring influenced and freely slidable spindle 57 supported by a bracket 58 on the top of the cylinder and provided with a conical valve head 59 adapted to fit within the bottom of the air pipe.

The vacuum control valve on each filling head may also be carried by the cylinder 18 and communicate with the ported base plate 17 through a pipe 60 upstanding within the cylinder. Each vacuum valve may also consist of a spring influenced and freely slidable spindle 62 carrying a loosely fitted conical valve member 63 adapted to fit on to a seating in a co-aligned vacuum passage 64 formed in the bracket 58. The spindle 62 upstands from the top of the cylinder in alignment with an adjustable stop member 66 provided for example, on the top of the sleeve.

In use, after each can 4 has been filled in any suitable manner, with fruit it is delivered on to one of the aforesaid platforms 8. As the rotary mounting means continues its movement the platform and can carried thereby are raised with the result that the can strikes the aforesaid latch device 29 and couples the two associated vertically slidable rods 22 and 23 together before the can finally engages the resilient spacer element 46. During such movements, the relevant main discharge valve 21 is closed and its sleeve 19 is raised as in Figure 8 so as to permit liquid from the bowl to enter the cylinder 18 and discharge chamber 34 up to the liquid level obtaining in the bowl.

Continued rotation of the rotary mounting means results in the sleeve 19 commencing its downward movement which has the effect of raising the main discharge valve as in Figure 7 without cutting off the supply to the cylinder of the liquid which thus commences to enter the can under the influence of its own weight. Downward movement of the sleeve continues against the influence of the associated spring 32 until the sleeve engages its sealing ring 33 as in Figure 6 and the air vent and vacuum valves 59, 63 are actuated as in Figure 15 to close the air vent and subject the filling head to the influence of the vacuum. Trapped air within the can is thus effectively withdrawn whilst the liquid from the chamber 34 continues to flow into it. Before the can is filled, the sleeve 19 commences to rise and thus automatically closes the vacuum valve and once again admits atmospheric pressure to the cylinder 18 which functions to force the remaining liquid into the can and cause maximum penetration of the fruit prior to the closing of the main discharge valve 21 when the sleeve is returned to its uppermost position.

It will be appreciated from the foregoing that by providing the apparatus with a series of filling heads in the form of units, their construction, fitting and maintenance are simplified. The reduction of piping to a minimum and the provision of a single main sealing ring 33 in the bowl for each filling head and under the liquid therein contained, also reduces the possibility of undesirable leakage occurring.

The vacuum also assists in drawing each sleeve 19 down tightly on to its sealing ring whilst the spring 32 associated with each sleeve materially reduces the friction on the cams 11 and 26 actuating the filling heads.

If desired means may be provided for reciprocating the aforesaid sleeve 19 of each filling head, two or more times whilst each can is in engagement with the spacer element 46. This may be easily effected by multiplying the rises 26a in the contour of the endless cam track 26.

Thus, if air leakage to a can occurs during the first vacuum treatment due for example, to a damaged rim on the can body, the subsequent vacuum treatment or treatments effectively releases most of the remaining air in the can without withdrawing any of the liquid through the vacuum pump.

In addition the ports 31 in the upper end portion of each cylinder may be of relatively reduced diameter and inclined tangentially and downwardly towards the associated sleeve. This effectively separates any small amount of liquid that may remain in the aforesaid chamber 34, from the air being exhausted by the vacuum pump.

By locating the vacuum and air vent valves 59, 63, within the sleeve 19 of each filling head, no special sealing means are required, simple types of metal to metal valves and seatings being satisfactory.

It will also be apparent that the height of the liquid contained in the main bowl is unimportant and as the apparatus does not employ measuring chambers from which excess liquid may be carried over into the vacuum line, no provision for separation of liquid from the vacuum pump is required.

Although the invention has been described by way of example to the supply of syrup to canned fruit, it will be readily apparent that the invention is not limited thereto but that it may be employed if so desired for adding brine or any other suitable liquid to canned vegetables. Furthermore, it is to be understood that the term "can" is to be construed, so as to include containers made of glass or any other suitable material.

Various alternations, modifications and/or additions may be introduced into the foregoing construction and arrangement of parts without departing from the ambit of the invention as defined by the appended claims.

Having now described my invention, what I claim as new and desire to secure by Letters Patent is:

1. Apparatus of the kind indicated comprising a filling head which includes a stationary cylinder having a liquid inlet port in its side wall and a main discharge valve at the lower end thereof, a reciprocatory sleeve closed at the top and mounted on said cylinder for opening and closing the liquid inlet port, a vacuum control valve and an atmospheric valve both of which are located within said sleeve and are adapted to subject the cylinder to the influence of a partial vacuum and to atmospheric pressure, a seating surrounding said cylinder adjacent its lower end and engageable by said sleeve when the latter is moved to cover the liquid inlet port, said seating and liquid inlet port being below normal operating liquid level to be immersed in the liquid to be discharged, and means within said sleeve and operable thereby for opening and closing said main discharge valve, and means for alternately opening and closing the atmospheric valve and vacuum control valve respectively, whereby movement of said sleeve in one direction closes the main discharge valve and admits a predetermined quantity of liquid to the cylinder whilst the atmospheric valve is open and the vacuum valve closed, and upon completion of movement of the sleeve in the opposite direction, admission of liquid to the cylinder ceases, the main discharge valve is opened, the atmospheric valve is closed and the cylinder is subjected to the influence of said partial vacuum after which the sleeve commences its return movement which has the effect of again subjecting the cylinder to the influence of atmospheric pressure before the main discharge valve is finally closed and thus forces the remaining liquid in the cylinder into the can.

2. Apparatus according to claim 1 in combination with means for reciprocating said sleeve a plurality of times whilst each can is in engagement with the filling head whereby the contents of the can is subjected to the influence of the partial vacuum more than once before the can leaves the filling head.

3. Apparatus according to claim 1, wherein said valve controlled atmospheric valve is located in said sleeve above the top of the maximum level of liquid in an associated main liquid supply bowl, said atmospheric valve consisting of an open ended pipe located in alignment with a spring influenced and freely slidable spindle mounted upon the cylinder and provided with a valve member adapted to fit within said pipe.

4. Apparatus according to claim 1, wherein said vacuum control valve is carried by the cylinder and associated with pipes and passages in the filling head leading to a vacuum producing means, said vacuum control valve consisting of a spring influenced and freely slidable spindle carrying a loosely fitted valve member adapted to engage a seating in a co-aligned vacuum passage and a stop member carried by said sleeve and adapted to periodically engage the freely slidable spindle of the vacuum control valve during movement of said sleeve.

5. Apparatus according to claim 1, wherein said filling head is carried by a ported base plate so as to form a removable unit, said base plate being adapted for mounting within and upon the bottom of a main supply bowl so as to register with apertures therein, one of said apertures communicating with vacuum producing means whilst another accommodates a seating for said main discharge valve.

6. Apparatus according to claim 1 wherein said filling head is carried by a ported base plate so as to form a removable unit, said base plate being adapted for mounting within and upon the bottom of a main supply bowl so as to register with apertures therein, one of said apertures communicating with vacuum producing means whilst another accommodates a seating for said main discharge valve, said ported base plate also carrying an upstanding tube, the upper end of which is located above the top of the maximum liquid level in said bowl, said tube accommodating a vertically slidable rod which depends beneath the bowl for connection to actuating mechanism and is connected at its opposite end to said sleeve so as to raise and lower the latter lengthwise of its cylinder.

7. Apparatus according to claim 1, wherein said filling head is carried by a ported base plate so as to form a removable unit, said base plate being adapted for mounting within and upon the bottom of a main supply bowl so as to register with apertures therein, one of said apertures communicating with vacuum producing means whilst another accommodates a seating for said main discharge valve, said sleeve being spring influenced and adapted to engage a sealing ring carried by said ported base plate so as to surround the cylinder.

8. Apparatus according to claim 1, wherein said main discharge valve is carried by an upstanding stem located axially within its cylinder and connected at its upper end to a lever arm which is pivotally mounted upon the cylinder and adapted to be engaged by a striker element on the sleeve so as to actuate the main discharge valve upon sliding movement of the sleeve.

9. Apparatus according to claim 1, wherein the main discharge valve has an associated seating which carries a resilient spacer and sealing element adapted to fit within the top of a can whilst it is being charged with liquid so as to ensure that sufficient space is left in the can after the admission of liquid has been completed prior to the fitting of the closing lid.

10. Apparatus of the kind indicated, comprising a supporting unit, rotary mounting means thereon for a series of circumferentially spaced can platforms, a main liquid supply container located above said platforms and carrying a series of circumferentially spaced filling heads in said container and in registry with the series of platforms, said container being open to atmospheric pressure, means for automatically actuating said filling heads in synchronism during movement of said rotary mounting means, and vacuum producing means communicating independently with said filling heads and each filling head including an upstanding ported cylinder, a reciprocatory sleeve thereon to open and close liquid inlet ports in the side of the cylinder, a main discharge valve adjacent the bottom of said cylinder, a valve controlled air vent communicating with said cylinder, a vacuum control valve in said filling head, and means operable by said sleeve for opening and closing each of said valves, said reciprocatory sleeves being actuated by a series of vertically slidable rods carried by said filling heads and associated with a second series of vertically slidable rods carried by said rotary mounting means, the adjacent end portions of the associated rods being adapted for detachable connection by can operable latches so that each pair of rods may move lengthwise in unison, whereby to prevent the discharge of liquid from any filling head that has not been supplied with a can.

11. Apparatus of the kind indicated, comprising a supporting unit, rotary mounting means thereon for a series of circumferentially spaced can platforms, a main liquid supply container located above said platforms and carrying a series of circumferentially spaced filling heads in said container and in registry with the series of platforms, said container being open to atmospheric pressure, means for automatically actuating said filling heads in synchronism during movement of said rotary mounting means, and vacuum producing means communicating independently with said filling heads and each filling head including an upstanding ported cylinder, a reciprocatory sleeve thereon to open and close liquid inlet ports in the side of the cylinder, a main discharge valve adjacent the bottom of said cylinder, a valve controlled air vent communicating with said cylinder, a vacuum control valve in said filling head, and means operable by said sleeve for opening and closing each of said valves, each of said filling heads being carried by a ported base plate so as to form a removable unit, said base plate being adapted for mounting within and upon the bottom of a main supply bowl so as to register with apertures therein, one of said apertures communicating with vacuum producing means whilst another accommodates a seating for said main discharge valve, and a main vacuum pipe leading from vacuum producing means to a manifold located on the bottom of a main liquid supply bowl and which includes a number of branch passages leading to said ported base plates, said manifold including a circular channel of substantially inverted U shape in cross section formed in the bottom of the bowl and fitted with a cover plate.

12. Apparatus of the kind indicated, comprising a supporting unit, rotary mounting means thereon for a series of circumferentially spaced can platforms, a main liquid supply container located above said platforms and carrying a series of circumferentially spaced filling heads in said container and in registry with the series of platforms, said container being open to atmospheric pressure, means for automatically actuating said filling heads in synchronism during movement of said rotary mounting means, and vacuum producing means communicating independently with said filling heads and each filling head including an upstanding ported cylinder, a reciprocatory sleeve thereon to open and close liquid inlet ports in the side of the cylinder, a main discharge valve adjacent the bottom of said cylinder, a valve controlled air vent communicating with said cylinder, a vacuum control valve in said filling head, and means operable by said sleeve for opening and closing each of said valves, said means for automatically actuating said filling heads including an endless double, parallel cam track stationarily mounted on said supporting unit and accommodating rollers carried by a series of vertically slidable rods carried by said rotary mounting means and which are operatively connected to said reciprocatory sleeves.

13. Apparatus of the kind indicated, comprising a supporting unit, rotary mounting means thereon for a series of circumferentially spaced can platforms, a main liquid supply container located above said platforms and carrying a series of circumferentially spaced filling heads in said container and in registry with the series of platforms, said container being open to atmospheric pressure, means for automatically actuating said filling heads in synchronism during movement of said rotary mounting means, vacuum producing means communicating independently with said filling heads and each filling head including an upstanding ported cylinder, a reciprocatory sleeve thereon to open and close liquid inlet ports in the side of the cylinder, a main discharge valve adjacent the bottom of said cylinder, a valve controlled air vent communicating with said cylinder, a vacuum control valve in said filling head, and means operable by said sleeve for opening and closing each of said valves, and means for raising and lowering said cam platforms during movement of said rotary mounting means, said platform actuating means including an endless cam track stationarily mounted upon the supporting unit and accommodating track rollers, each of which is connected to one or more vertically slidable posts carrying a can platform.

14. Apparatus of the kind indicated comprising a supporting unit, rotary mounting means thereon for a series of circumferentially spaced can platforms each of which is carried by one or more vertically slidable posts fitted with a roller adapted to track around a circular cam track stationarily mounted upon said supporting unit, a main liquid supply bowl carried by said rotary mounting means so as to be located above said platforms and carrying a series of circumferentially spaced filling heads disposed within the bowl and in registry with the series of can platforms, vacuum producing means communicating with said filling heads each of which filling head includes an upstanding ported cylinder, a spring influenced reciprocatory sleeve thereon adapted to open and close liquid inlet ports in the side of the cylinder, a series of vertically slidable rods partly located within said bowl and each of which is connected at its upper end to one of said sleeves and provided at its lower end with a can operable latch adapted to engage one of a second series of vertically slidable posts carried by said rotary mounting means and provided with rollers engaging a circular double parallel cam track stationarily mounted on said supporting unit, a main discharge valve at or adjacent to the bottom of each cylinder and adapted to be opened and closed by its associated sleeve, each filling head also including a valve controlled air vent communicating with said cylinder and a vacuum control valve, each said air vent valve and vacuum control valve being also automatically actuated by movement of their associated sleeve.

15. Apparatus of the kind indicated comprising a supporting unit, rotary mounting means thereon for a series of circumferentially spaced can platforms, a main liquid supply container located above said platforms and carrying a series of circumferentially spaced filling heads in said container and in registry with the series of platforms, said container being open to atmospheric pressure, means for automatically actuating said filling heads in synchronism during movement of said rotary mounting means and vacuum producing means communicating independently with said filling heads, each of which filling head includes an upstanding stationary cylinder having a liquid inlet port in its side wall and a main discharge valve at the lower end thereof, a reciprocatory sleeve closed at the top and mounted on said cylinder for opening and closing the liquid inlet port, a vacuum control valve and an atmospheric valve both of which are located within said sleeve and are adapted, when in use, to periodically subject the cylinder to the influence of a partial vacuum and to atmospheric pressure, a seating surrounding said cylinder adjacent its lower end and which is engageable endwise by said sleeve when the latter is moved to cover the liquid inlet port, said seating and liquid inlet port being immersed when in use, in the liquid to be discharged, and means within said sleeve and operable thereby for opening and closing said main discharge valve, the atmospheric valve and vacuum control valve.

16. For use in apparatus of the kind indicated, a filling head unit comprising a ported base plate carrying an upstanding cylinder having a series of longitudinally spaced liquid inlet ports in the side thereof and provided with a spring influenced longitudinally reciprocatory sleeve which is closed at the top, a sealing ring on said base plate engageable by the lower end of said sleeve, a main discharge valve adapted to engage a seating on the bottom of said cylinder, an air vent extending through the closed top of said sleeve and having an associated spring influenced atmospheric valve carried by said cylinder and a vacuum control valve also carried by said cylinder so as to open and close an associated and independent vacuum passage, said vacuum control valve being spring influenced and adapted to be actuated by a stop member carried by said sleeve, both the vacuum control valve and atmospheric valve being located within said sleeve and means operable so as to periodically subject the cylinder to the influence of a partial vacuum and to atmospheric pressure, and means within said sleeve and operable thereby for opening and closing said main discharge valve.

References Cited in the file of this patent

UNITED STATES PATENTS

| Number | Name | Date |
|---|---|---|
| 874,874 | Taylor | Dec. 24, 1907 |
| 1,437,917 | Shelor | Dec. 5, 1922 |
| 2,093,365 | Ransom et al. | Sept. 14, 1937 |
| 2,363,543 | Miller | Nov. 28, 1944 |